Figure 1:
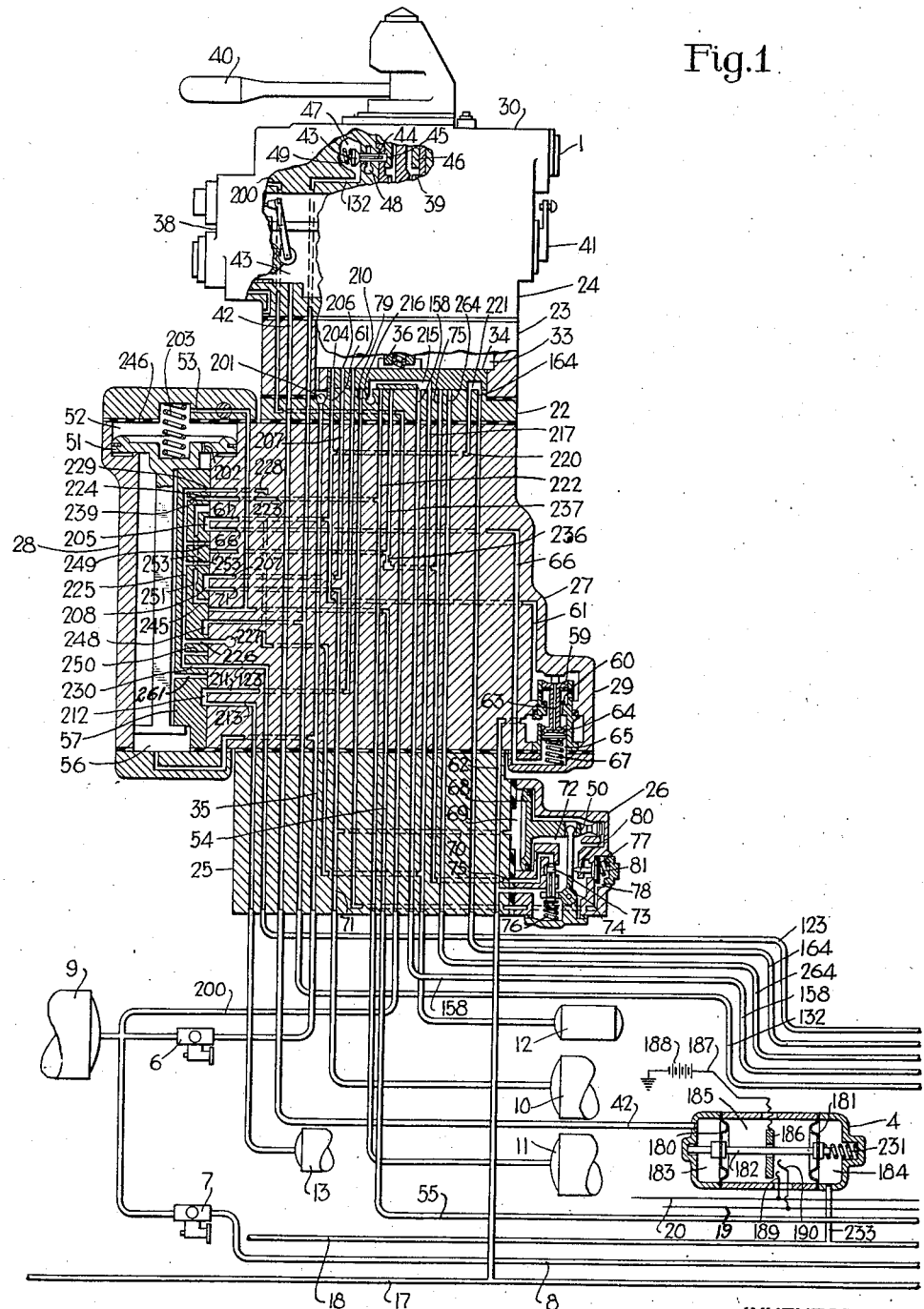

June 15, 1943.  G. T. McCLURE  2,322,042

BRAKE CONTROL MEANS

Filed Nov. 29, 1941  2 Sheets-Sheet 2

INVENTOR
Glenn T. McClure
BY
ATTORNEY

Patented June 15, 1943

2,322,042

UNITED STATES PATENT OFFICE 2,322,042

BRAKE CONTROL MEANS

Glenn T. McClure, McKeesport, Pa., assignor to The Westinghouse Air Brake Company, Wilmerding, Pa., a corporation of Pennsylvania Application November 29, 1941, Serial No. 420,949

15 Claims. (Cl. 303—18)

This invention relates to fluid pressure brake equipment for railway locomotives and more particularly to the combined automatic and straight air type of locomotive equipment embodying means controlled by the engineer and by traffic or signal conditions on a railway system for controlling the brakes on the locomotive and cars of a train.

In Patent No. 2,256,283 issued to Ellis E. Hewitt and Donald L. McNeal on September 16, 1941, there is disclosed a locomotive brake equipment of the above type which embodies an engineer's brake valve device having an automatic portion for controlling the brakes on the locomotive and cars of a train on the usual automatic principle through a brake pipe and having a straight air portion for controlling the brakes on the locomotive and cars of the train on the well known straight air principle through a straight air train pipe. A selector handle on the side of the brake valve device is movable to an automatic position for rendering the automatic portion operative and to a straight air position for rendering the straight air portion operative. The equipment further comprises a brake application valve device which is controlled by track signals and adapted to operate automatically upon an adverse change in traffic conditions, as indicated by the track signals, to apply the brakes on the locomotive and cars of the train.

Also associated with the brake equipment disclosed in the above referred to patent is an automatic suppression device and a straight air suppression device, either one or the other of which is adapted to operate to prevent response of the brake application valve device to a change in track signals if the engineer is alert and operates the brake valve device to effect an application of the brakes on the locomotive and train promptly when warned of such change. The automatic suppression device is operative upon operation of the brake valve device while the selector handle is in the automatic position, while the straight air suppression device is operative upon operation of the brake valve device while the selector handle is in the straight air position.

One object of the present invention is the provision of an improved locomotive brake equipment of the above type.

Another object of the invention is the provision of improved suppression means for preventing an automatic application of brakes upon a change in track signals if the engineer is alert and operates the brake valve device to effect an application of the brakes on the locomotive and cars of the train promptly when warned of such change.

Another object of the invention is the provision of improved suppression means for an equipment of the above type embodying a single device which is selectively operative for both automatic and straight air operation of the brake valve device.

Other objects and advantages will be apparent from the following more detailed description of the invention.

Figure 3:
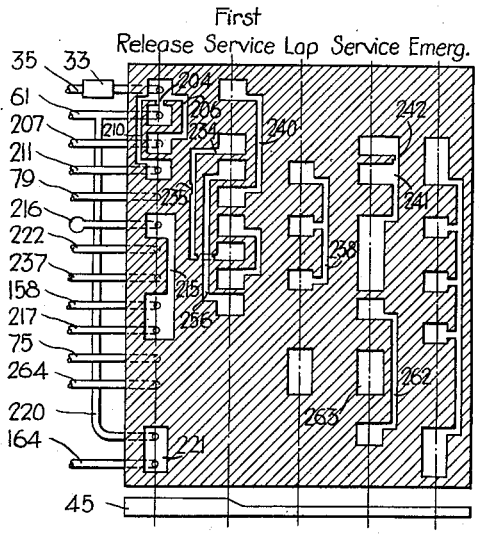
Figure 2:
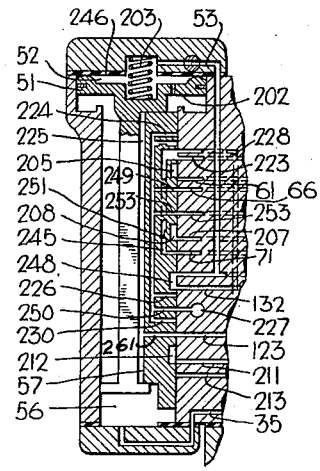
Figure 1A:
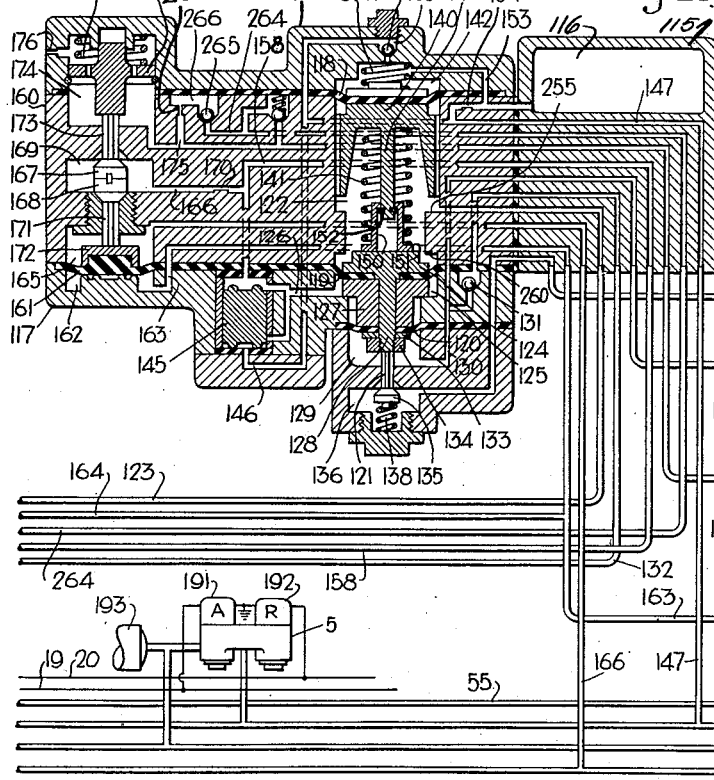

In the accompanying drawings Figs. 1 and 1A, when taken together, are a diagrammatic view mainly in section of a locomotive brake equipment embodying the invention; Fig. 2 is a diagrammatic view of the automatic train control brake application valve device shown in Fig. 1 but with the parts in their brake application position, whereas in Fig. 1 said parts are shown in their normal position; and Fig. 3 is a diagrammatic development view of the automatic portion of the brake valve device shown in Fig. 1.

As shown in the drawings the locomotive brake equipment comprises a brake controlling valve device 1, a timing valve device 2, a combined automatic and straight air suppression valve device 3, a master switch device 4, an application and release magnet valve device 5, the usual brake pipe charging feed valve device 6, another feed valve device 7 for supplying fluid at reduced pressure to a fluid pressure supply pipe 8, and the usual main reservoir 9 and equalizing reservoir 10.

The equipment further comprises a first reduction limiting reservoir 11, a second reduction limiting reservoir 12, a first or temporary suppression reservoir 13, a permanent suppression reservoir 14, a stop reservoir 15, and a timing reservoir 16.

In addition to the above there are also provided the usual brake pipe 17, straight air train pipe 18, and application and release train wires 19 and 20, respectively, said pipes and wires being adapted to extend from one end to the opposite end of the locomotive and to be connected by suitable couplers and connectors (not shown) to corresponding pipes and wires (not shown) on a connected car for controlling the brakes on a train either on the usual automatic principle through the medium of the brake pipe 17 or on the straight air principle through the medium of said wires and the straight air pipe 18.

The brake controlling valve device 1 comprises a pipe bracket 25 on one side of which is mounted a combined equalizing brake pipe discharge valve and maintaining valve mechanism 26. This bracket carries on its upper face a casing section 27 with which is associated a brake application valve device 28 adapted, under control of the timing valve device 2, to operate in accordance with change in traffic signals. Also associated with the casing section 27 is a brake pipe cut-off valve device 29.

Mounted on the upper surface of the casing section 27 is an engineer's combined automatic and straight air brake valve device 30 through the medium of which an engineer is adapted to control the brakes on the locomotive and train either on the usual automatic principle through the medium of the brake pipe 17 or on the usual straight air principle through the medium of the appliction and release train wires 19 and 20 and the straight air pipe 18. This brake valve device may be substantially the same as that disclosed in Patent 2,106,483 issued to Ellis E. Hewitt on January 25, 1938. Accordingly, only those parts of this device are shown in the drawings which are deemed essential to a clear comprehensive understanding of the present invention.

As shown in the drawings the brake valve device comprises three casing sections 22, 23 and 24 mounted one on top of the other in the order named with the casing section 22 disposed on the upper surface of the casing section 27. The casing section 23 has a chamber 33 containing a rotary valve 34 disposed to turn on a seat provided on the upper end face of casing section 22. The chamber 33 is connected through a passage 35 to the brake pipe charging feed valve device 6 and therefore is adapted to be constantly supplied with fluid from the main reservoir 9 at the reduced pressure desired for carrying in the brake pipe 17.

The rotary valve 34 is provided for controlling the brakes on the locomotive and train through the medium of the brake pipe 17 and accordingly is adapted to be rotated by the engineer through the medium of a shaft 36 to a number of different control positions, namely release position, first service position, lap position, service position, and emergency position, as illustrated in Fig. 3 of the drawings.

The casing section 24 contains a self-lapping application and release valve device 38 for controlling the brakes on the train by straight air through the medium of the straight air pipe 18.

For controlling the operation of the rotary valve 34 and of the self-lapping valve device 38 a shaft 39 is journaled in the casing section 24 and is connected to a handle 40 provided for operation by the engineer. In the casing section 24 there is a clutch means (not shown) adapted to connect the shaft 39 to the self-lapping valve device 38 for controlling its operation without operating the rotary valve 34. This clutch is also adapted to be positioned for operating the rotary valve 34 without actuating the self-lapping valve device 38. The positioning of this clutch is controlled by a selector handle 41 mounted on the outside of the brake valve casing. This handle is movable to a straight air brake controlling position for connecting the shaft 39 to the self-lapping valve device 38 and for disconnecting same from the rotary valve 34 and is also movable to an automatic brake controlling position for disconnecting the shaft 39 from the valve device 38 and for connecting same with the rotary valve 34.

The self-lapping application and release valve device 38 is provided for varying the pressure in a straight air control pipe 42 one end of which is open to a chamber 43 in the casing section 24 while the other end is connected to the master switch device 4. With the selector handle 41 in the straight air position an application of the brakes is adapted to be effected by moving the brake valve handle 40 out of release position to any desired position in an application zone (not shown) whereupon the valve device 38 is adapted to operate to disconnect the straight air control pipe 42 from the atmosphere and to supply fluid to said pipe at a pressure dependent upon the extent of movement of said handle from the release position. A release of a straight air application of brakes is adapted to be effected by return of the handle 40 to its release position for venting fluid under pressure from chamber 43 and straight air control pipe 42.

A further description of the structure and operation of the straight air portion 38 and of the means for selectively rendering either said portion or the rotary valve 34 effective or ineffective is not deemed essential in the present application since reference may be made to the aforementioned patent of Ellis E. Hewitt wherein this structure is completely disclosed and described. The operation of the automatic portion of the brake valve device including the rotary valve 34, will be explained hereinafter.

At one side of the handle operated shaft 39 in the casing section 24 is a poppet valve 43 having a fluted stem 44 which extends through a suitable bore in the casing for engagement by a cam 45 which is formed on the exterior of a sleeve 46 secured to rotate with the shaft 39. This cam is so designed as to unseat the valve 43 in all positions of the handle 40 corresponding to the release and first service positions and to permit closure of the valve in the other positions. The valve 43 is contained in a chamber 47 and controls communication between said chamber and an atmospheric vent port 48. A spring 49 in chamber 47 acts on the valve 43 for urging it to its seat.

The brake application valve device 28 comprises a piston 51 having at one side a chamber 52 which is connected through passages 53 and 54 to a pipe 55 leading to the timing valve device 2. At the opposite side of the piston is a valve chamber 56 constantly supplied with fluid at feed valve pressure from passage 35 and containing a slide valve 57 which is connected to the piston 51 for movement therewith.

The brake pipe cut-off valve device 29 comprises a cut-off valve 59 which is arranged to cooperate with an annular valve seat 60 for closing communication between a brake pipe fluid pressure supply passage 61 and a passage 62 which is open to the brake pipe 17. The valve 59 is connected to one end of a stem 62 of smaller diameter than that of an opening encircled by the seat 60, said stem extending through said opening and being connected at the opposite end to a piston 64 which is subject on one side to brake pipe pressure from passage 62 but which at the opposite side has a chamber 65 which is connected by a passage 66 to the seat of the application slide valve 57. A spring 67 in chamber 65 acts on the piston 64 for urging it and the valve 59 to the valve open position shown.

The brake pipe discharge and maintaining valve mechanism 26 comprises an equalizing piston 68 having at one side a chamber 69 which is in constant communication through a passage 70 and passage and pipe 71 with the equalizing reservoir 10. At the opposite side of piston 68 is a chamber 72 which is in constant communication with the brake pipe 17 and which contains a brake pipe discharge valve 73.

The brake pipe discharge valve 73 is connected to one end of a bell crank 74 the opposite end of which is connected to a stem 50 projecting from the piston 68 whereby movement of the piston 68 in the direction of the left-hand upon a reduction in equalizing reservoir pressure in chamber 69 will pull the valve 73 from its seat to thereby open a brake pipe venting communication from chamber 72 to a brake pipe discharge passage 75 through which fluid under pressure is adapted to be vented from the brake pipe for effecting an automatic application of brakes. A spring 76 acts on the discharge valve 73 for seating same when the piston 68 and bell crank 74 occupy their normal positions shown.

A brake pipe maintaining valve 77 disposed at one side of the bell crank 74 is contained in a chamber 78 which is connected by a passage 79 to the seat of the rotary valve 34. This valve 77 is arranged to control communication between the chambers 78 and 72 and has a stem 80 extending into chamber 72 for engagement by the bell crank 74 upon movement of the equalizing piston 68 in the direction of the right-hand for unseating the valve 77. A spring 81 acts on valve 77 for urging same to its seat.

The timing valve device 2 comprises a magnet 85 adapted to be controlled by any suitable means (not shown) which are operative in response to favorable and unfavorable track signals and thereby the existing track conditions on a railway. When the track signal is favorable the magnet 85 is adapted to be energized and when unfavorable deenergized.

The magnet 85 is provided for controlling a pair of coaxially arranged oppositely seating poppet valves 86 and 87. The valve 86 is contained in a chamber 88 and is provided to control communication between said chamber and a chamber 90. The chamber 88 is connected by a passage 89 to the atmosphere through a restricted vent port 243 and an air operated whistle 91 adapted to produce a sound upon the flow of fluid under pressure therethrough. The valve 87 is contained in a chamber 92 which is constantly supplied with fluid under pressure through the pipe 8 by the feed valve device 7 and this valve is provided for controlling communication between said chamber and the chamber 90. A spring 93 in chamber 92 acts on the valve 87 for seating same and for at the same time unseating the valve 86 upon deenergization of the magnet 85.

The timing valve device 2 further comprises a double beat valve 95 contained in a chamber 96 which is connected by a passage and pipe 97 to the suppression valve device 3. The valve 95 is provided with a fluted stem 98 which extends into a chamber 99 connected by pipe 55 to piston chamber 52 of the application valve device 28. The valve 95 also has a fluted stem 100 extending in the opposite direction into a chamber 101 which is constantly open to the atmosphere through a vent port 102.

The chamber 101 is provided at one side of a valve piston 103 which is operatively connected to the valve stem 100 through the medium of a spring 104. At the opposite side of valve piston 103 is a chamber 105 in constant communication with a timing reservoir 106 and also connected by way of passages containing a choke 107 and a check valve 108, respectively, to the chamber 90, said choke and check valve being arranged in parallel and the check valve being arranged to provide for flow of fluid under pressure in the direction from chamber 90 to the timing reservoir 106 but to prevent flow in the opposite direction. On the face of valve piston 103 open to the timing reservoir 106 is an annular seat rib 109 of smaller diameter than that of the valve piston and adapted to effect sealing engagement with a gasket 110 in the lower position of the valve piston, the space outside of said rib being open to the atmosphere under this condition through a groove 111 by-passing the valve piston and connected to the chamber 101. With the valve piston 103 in its upper and normal position shown communication between the groove 111 and chamber 101 is closed.

In chamber 101 is a spring 112 for moving the valve piston 103 to its lower position under which condition a spring 113 in chamber 99 acting on the double beat valve 95 is adapted to move said valve from its normal position shown to a lower seated position for closing communication between chambers 96 and 101 and for opening the chamber 96 to chamber 99.

The suppression valve device 3 comprises a pipe bracket 115 containing a timing reservoir or volume 116, and carrying on one side a valve portion 117 containing a suppression valve device which will now be described.

The valve portion 117 comprises three coaxially aligned flexible diaphragms 118, 119 and 120 all of which are rigidly clamped around their peripheries in spaced relation with respect to each other as shown in the drawing. The diaphragms 118 and 119 are preferably of substantially the same diameter while the diaphragm 120 is of smaller diameter.

Between the diaphragms 118 and 119 is a chamber 122 which is connected by a passage and pipe 123 to the seat of the application slide valve 57 in the application valve device 28 and which contains a follower 124 engaging one face of diaphragm 119. Between the diaphragms 119 and 120 is a chamber 125 connected to a passage 126 and containing a follower 127 having a relatively large end engaging the diaphragm 119 and a smaller opposite end engaging one face of the diaphragm 120. The follower 124 has a stem 128 extending through a bore in the follower 127 and suitable openings in the diaphragms 119 and 120 into a chamber 129 which is formed at the opposite side of the diaphragm 120 and which is connected by a passage and pipe 130 to a stop reservoir 15, the passage 130 being also connected past a check valve 131 to a passage and pipe 132 which leads to the poppet valve chamber 47 in the brake valve device 30. In chamber 129 a diaphragm follower 133 is mounted against diaphragm 120 over the end of the follower stem 128 and a nut 134 on said stem is provided for clamping said follower and thereby the follower 124 against the opposite faces of the diaphragms 119 and 120 and thereby against the opposite ends of the intermediate follower 127 whereby said diaphragms and followers will move together.

The end of the follower stem 128 engages the end of a fluted stem 121 of a suppression valve 135 which is contained in a chamber 136, said stem being mounted to slide in a suitable bore provided through a wall separating the chambers 126 and 129. The chamber 136 is connected to pipe 97 leading to the double beat valve chamber 96 in the timing valve device 2 and contains spring 138 which acts on the valve 135 for urging it into contact with its seat. Movement of diaphragms 119 and 120 in a downwardly direction to a position such as shown in the drawing is adapted to unseat the valve 135.

A plunger 140 is mounted to slide in chamber 122 above the diaphragm follower 124 and has one face in contact with diaphragm 118. Projecting centrally from the plunger 140 into the chamber 127 is a stem 149 the end of which is slidably mounted in an opening through the closed end of an inverted cup shaped element 150 the opposite end of which is provided with an outturned annular flange 151 which bears against and is secured to the follower 124. The portion of the stem 149 within the element 150 is provided with an enlargement 152 for engaging the closed end of said element to hold the stem 149 against pulling out of the element but which provides for movement of said stem into said element. A coil spring 141 under a chosen degree of compression encircles the stem 149 and element 151 with one end bearing against the plunger 140 and the opposite end bearing against the flange 151 of element 150.

At the side of diaphragm 118 opposite that engaged by the plunger 140 is a chamber 142 containing a spring 143 acting on the diaphragm for deflecting same in a downwardly direction to thereby urge the plunger 140 and the diaphragms 119 and 120 to the position shown in the drawing for unseating the valve 135. The force of spring 143 is relatively small as compared to that of spring 141, so that under the condition just mentioned the spring 141 will act in the capacity of a substantially solid strut connecting the plunger 140 and the diaphragm follower 124.

The diaphragm chamber 142 is connected through a passage 153 to the timing volume 116 and also through a choke 154 to a passage 147 which is in permanent communication with straight air pipe 18. The passage 147 is also connected to passage 146 which leads to one end of a double check valve 145 and which also leads to a chamber 155 which contains a check valve 156 controlling communication between said passage and the diaphragm chamber 142, said check valve being arranged to provide for flow of fluid under pressure in the direction from the chamber 142 to chamber 155 but to prevent flow in the opposite direction.

The side outlet of the double check valve 145 is open to passage 126 which leads to chamber 125 between the two diaphragms 119 and 120. The end of the double check valve 145 opposite that connected to the straight air pipe passage 146 is connected to a passage 158 which leads to the seat of rotary valve 34 in the engineer's brake valve device 30.

The valve portion 117 of the combined automatic and straight air suppression valve device 3 also comprises an automatic reduction insuring valve device 160. The reduction insuring valve device 160 comprises a flexible diaphragm 161 clamped around its periphery and having at one side a chamber 162 which is connected by a passage and pipe 163 to the permanent suppression reservoir 14, the pipe 163 being also connected by a pipe and passage 164 to the seat of rotary valve 34. At the opposite side of the diaphragm 161 is a chamber 165 which is in constant communication with the brake pipe 17 through a passage and pipe 166.

The reduction insuring device 160 also comprises two oppositely disposed valves 167 and 168 contained in a chamber 169 which is open through a passage containing a choke 170 to passage 158 leading to one end of the double check valve 145. The valve 168 has a fluted stem 171 extending through a suitable bore in the casing into diaphragm chamber 165 and therein engaging a follower 172 mounted against the one face of the diaphragm 161. The valve 167 has a fluted stem 173 disposed opposite the valve stem 171 and extending through a bore in a partition separating the chamber 169 from a chamber 174 which is in constant communication through a passage and pipe 175 with the timing reservoir 16 and with the atmosphere through a choke 176. A plunger 177 is slidably mounted in chamber 174 and has one side engaging the fluted stem 173 while the opposite side is engaged by one end of a coil spring 178.

The master switch device 4 comprises a casing containing two flexible diaphragms 180 and 181 arranged in spaced relation and connected by a stem 182 for movement together. At one side of the diaphragm 180 is a chamber 183 which is connected to the straight air control pipe 42. At the opposite side of the diaphragm 181 is a chamber 184 connected through pipe 233 to the straight air pipe 18. Intermediate the diaphragms 180 and 181 is a chamber 185 which contains a movable contact 186 secured to but insulated from the stem 182 and movable with said stem upon deflection of the diaphragms 180 and 181.

The contact 186 is connected by a suitable conductor 187 to any desired source of electric current such as one terminal of a battery 188 the other terminal of which may be grounded. Carried by the casing and extending into chamber 185 are a pair of contact fingers 189 and 190, said fingers being so arranged that upon movement of contact 186 in the direction of the right-hand said contact will first engage the finger 189 and then the finger 190, while upon movement of contact 186 in the reverse direction said fingers will be disconnected therefrom in the reverse order. The finger 189 is connected to the release train wire 20 while the finger 190 is connected to the application train wire 19.

The application and release magnet valve device 5 comprises an application magnet 191 connected to the application train wire 19 and a release magnet 192 connected to the release train wire 20. Energization of the normally deenergized application magnet 191 upon supply of electric current through the application train wire 19 is adapted to supply fluid under pressure from a reservoir 193, which may be constantly supplied with fluid under pressure from the feed valve pipe 8, to the straight air pipe 18 for effecting a straight air application of brakes, while deenergization of said magnet is adapted to cut off the supply of fluid under pressure to the straight air pipe. The release magnet 192 is normally deenergized to provide for the venting of fluid under pressure from the straight air pipe 18 for effecting a release of a straight air application of brakes and is operative upon energization to close the vent from the straight air pipe so that the brakes may be applied in accordance with the operation of the application magnet 191.

*Operation charging of brake equipment*

In operation, fluid under pressure supplied to the main reservoir 9 in the usual manner flows therefrom to the feed valve devices 6 and 7 and also through a pipe and passage 200 to the self-lapping application and release valve device 38 in the engineer's brake valve device. The feed valve device 6 operates to supply fluid at the pressure desired to be normally carried in the brake pipe 17 to pipe and passage 35 through which it flows to the application valve chamber 56 and past a ball check valve 201 to the rotary valve chamber 33. The feed valve device 7 operates to supply fluid at a desired reduced pressure to pipe 8 for charging the reservoir 193 associated with the application and release magnet valve device 5, and fluid supplied to this pipe also flows to chamber 92 in the timing valve device 2.

Now let it be assumed that the handle 40 of the engineer's brake valve device is in its brake release position shown, that the selector handle 41 on the side of the brake valve device is turned to the straight air position providing for control of the brakes through the straight air pipe 18 by operation of the self-lapping application and release valve device 38 in the brake valve device, and let it further be assumed that the traffic condition or signal indication is favorable and that the timing magnet 85 is as a consequence energized seating the valve 86 and unseating the valve 87.

With the valve 87 unseated fluid supplied to chamber 92 flows past said valve to chamber 90 and thence through choke 107 and past check valve 108 to the timing reservoir 106 and to chamber 105 beneath the valve piston 103. When the pressure of fluid thus obtained in chamber 105 on valve piston 103 is increased sufficiently to overcome the opposing pressure of spring 112 it is adapted to move said valve piston and thereby the double beat valve 95 to their upper seated positions shown in which said valve closes communication between chambers 99 and 96.

In the brake application valve device 28 fluid at feed valve pressure supplied to valve chamber 56 equalizes therefrom through a small feed port 202 in the application piston 51 into piston chamber 52 and thence into passages 53 and 54 and pipe 55 connected to chamber 99 in the timing valve device 2, such equalization being obtained with the double beat valve 95 in the timing valve device seated in its upper position shown and just described. With the pressures thus equalized on the opposite sides of the application piston 51 a spring 203 acting on said piston is rendered effective to hold the piston 51 and thereby the slide valve 57 in their normal brake release positions shown.

With the rotary valve 34 in its release position shown fluid at feed valve pressure supplied past the check valve 201 to valve chamber 33 flows therefrom through a port 204 in the rotary valve to passage 61 leading to the cut-off valve device 29 and also to the seat of the application slide valve 57. In the normal or release position of this slide valve the passage 61 is connected by a cavity 205 to passage 66 leading to the cut-off valve piston chamber 65 whereby said chamber becomes charged with fluid at feed valve pressure which renders the spring 67 acting on piston 64 effective to move said piston and thereby the valve 59 to the position shown in which passage 61 supplied with fluid at feed valve pressure is connected to passage 62 through which fluid under pressure is then supplied to the brake pipe 17 for charging same to the pressure supplied by the feed valve device 6.

At the same time as the brake pipe is thus charged, fluid at feed valve pressure also flows from the rotary valve chamber 33 through a port 206 in the rotary valve to a passage 207 leading to the seat of the application slide valve 57 and thence through a cavity 208 in said valve to passage 71 leading to the equalizing reservoir 10 and connected to passage 70 leading to the equalizing piston chamber 69 in the brake pipe discharge valve mechanism whereby said reservoir and piston chamber are also charged with fluid at feed valve pressure as supplied to the brake pipe 17. Chamber 72 at the opposite side of the equalizing piston 68 is in constant communication with the brake pipe so that the fluid pressures acting on the opposite sides of the equalizing piston during charging of the brake pipe are substantially equalized which permits spring 76 to seat the brake pipe discharge valve 73 and also permits spring 81 to hold the maintaining valve 77 in its seated or closed position shown.

Fluid at feed valve pressure also flows from the rotary valve chamber 33 through a port 210 in the rotary valve to a passage 211 which is connected by a cavity 212 in the application slide valve 57 to a passage 213 leading to the suppression reservoir 13 whereby said reservoir is also charged with fluid at feed valve pressure with the brake valve device and brake application valve device in their release positions.

With the rotary valve 34 in its release position passage 158 connected to the upper side of the double check valve 145 in the combined straight air and automatic suppression valve device is open to the atmosphere through a cavity 215 in the rotary valve and a vent port 216. The second reduction reservoir 12 is also open to the atmosphere at this time by being connected to the cavity 215 through a passage and pipe 217. The permanent suppression reservoir 14 is charged with fluid under pressure from rotary valve chamber 33 in the release position of rotary valve 34 by way of passage 61, a branch passage 220, cavity 221 in the rotary valve, passage and pipe 164 and pipe 163.

The first reduction reservoir 11 is connected by a pipe and passage 222 to the seat of the rotary valve 34 where said passage is lapped by said valve in its release position. Passage 222 is however connected by a passage 223 to the seat of the application slide valve 57 which has a port 224 connecting said passage to a vented passage 225 which is open through a port 226 to an atmospheric vent 227 whereby said reservoir is normally at atmospheric pressure. The second reduction reservoir 12 is also connected through passage and pipe 217 to a passage 228 leading to the seat of the application slide valve 57 and said valve is provided with a port 229 which in the release position of said valve connects the passage 228 to passage 225 which is open to the atmosphere through the vent 227. The application slide valve 57 in its release position also connects chamber 122 between the two diaphragms 118 and 119 in the suppression device to the atmosphere by way of passage and pipe 123 and a port 230 in said valve which connects the passage 123 to the vent passage 225.

With the straight air application and release valve portion 38 of the brake valve device in its release condition obtained by handle 40 in its release position the straight air control pipe 42 and thereby diaphragm chamber 183 in the master switch device 4 are both vented to the atmosphere through chamber 43. Under this condition a light bias spring 231 in the master switch acting on diaphragm 181 will urge the diaphragms 180 and 181 and thereby the contact 186 to their normal position shown in which said contact is out of engagement with the contact fingers 189 and 190 whereby both the application and release magnets 191 and 192 will be deenergized. With the application magnet 191 deenergized the supply of fluid to the straight air pipe 18 will be cut off, while deenergization of release magnet 192 will open said pipe to the atmosphere.

In the suppression valve device 3 the timing volume 116 and connected chamber 142 above the diaphragm 118 are normally void of fluid under pressure due to being open to the straight air pipe 18 through pipe 147. Chamber 122 at the opposite side of the diaphragm 118 is open to the atmosphere through the application slide valve 57 as above described. Chamber 125 at the opposite side of the diaphragm 119 is also open to the atmosphere at this time due to the fact that the lower face of the double check valve 145 is at atmospheric pressure on account of being connected with the straight air pipe through pipe 147 while the chamber above said check valve is likewise vented by way of passage 158 which is open to the atmosphere through the rotary valve 34. With the diaphragm chambers 142, 122, and 125 all at atmospheric pressure the spring 141 is effective to urge the piston 140 and the diaphragm follower 124 away from each other until the enlargement 152 on stem 149 contacts the end of the member 150. The pressure of the relatively light spring 143 on the diaphragm 118 is then effective through spring 141 and diaphragms 119 and 120 to maintain the suppression valve 135 unseated so as to connect chamber 96 in the timing valve device 2 to passage 130 which is open past the check valve 131 and through pipe and passage 132 to the atmosphere past the poppet valve 49 in the brake valve device which is in release position. The stop reservoir 15 is also open to the atmosphere at this time due to being connected with the vented passage 130.

In the reduction insuring valve device 160, chamber 162 is charged with fluid at the pressure supplied by the feed valve device 6 due to being open through passage 163 to the charged permanent suppression reservoir 14. Chamber 165 at the opposite side of the diaphragm 161 is also charged with fluid at the same pressure on account of being in constant communication with the brake pipe 17 through passage and pipe 166. As a result the pressure of spring 178 on plunger 177 is rendered effective to hold the valve 168 seated and the valve 167 unseated as shown in the drawing.

The brake pipe 17 is now fully charged with fluid under pressure and the straight air pipe 18 is vented under which condition the brakes on a locomotive provided with this equipment as well as those on the coupled cars of a train will be released.

The locomotive brake equipment is now in condition for operation to control the brakes on a locomotive and cars of a train, it being noted that the handle 40 of the brake valve device 30 is in its release position and that the magnet 85 of the timing valve device 2 is energized due to the traffic conditions or track signals being favorable to permit movement of the locomotive and train.

Let is be assumed that the selector handle 41 on the side of the brake valve device is in the position providing for straight air control of the brakes on a locomotive and cars of a train through the medium of the straight air pipe 18 by operation of the brake valve handle 40. Under this condition the self-lapping application and release valve device 38 in the brake valve device 30 is cut in for response to operation of handle 40 while the rotary valve 34 will remain in the normal release position shown, during such operation, as before described.

*Electropneumatic supply of fluid under pressure to straight air pipe to effect straight air application of brakes*

With the parts of the locomotive brake equipment conditioned as above described, if it is desired to effect an electropneumatic straight air application of the brakes, the handle 40 of the brake valve device 1 is operated to actuate the self-lapping application and release valve device 38 of the brake valve device to supply fluid from passage 200 to chamber 43 and thence to the straight air control passage and pipe 42 at a desired chosen pressure determined by the extent of movement of the brake valve handle 40 from its normal release position.

The fluid pressure thus supplied to the straight air control pipe 42 flows to diaphragm chamber 183 in the master switch device 4 wherein it acts on diaphragm 180 to move said diaphragm and thereby the stem 182, contact 186, and diaphragm 181 in the direction of the right-hand. As the contact 186 is thus operated it contacts first the finger 189 and then the finger 190 so as to supply electric current from the battery 188 first to the release train wire 20 and then to the application train wire 19. On the locomotive the release magnet 192 is therefore first energized so as to close the atmospheric vent from the straight air pipe 18 and subsequently, the application magnet 191 is energized to supply fluid under pressure to said straight air pipe to thereby cause a straight air application of brakes.

Fluid pressure thus supplied to the straight air pipe 18 on the locomotive flows therefrom through pipe 233 to chamber 184 in the master switch device 4 and when the pressure of fluid in said chamber becomes increased to a degree substantially equal to or slightly exceeding that supplied through control pipe 42 to diaphragm chamber 183, the diaphragm 181 is operated to shift the stem 182 and thereby the contact 186 in the direction of the left-hand to a lap position in which said contact is disengaged from the application finger 190. The application wire 19 and thereby the application magnet 191 are thus deenergized so as to cut off further supply of fluid under pressure to the straight air pipe 18 thereby limiting the pressure obtainable in said pipe to substantially the same degree as provided in diaphragm chamber 183 as determined by the position or extent of movement of the brake valve handle away from its release position 40. By thus limiting the pressure obtained in chamber 184 to substantially the same degree as provided in chamber 183 movement of the contact 186 will be stopped upon disengagement from finger 190 and therefore before moving out of contact with the release finger 104. The release wire 20 and thereby the release magnet 122 will therefore remain energized so that the pressure in the straight air pipe 18 will be held substantially equal to that supplied by the brake valve device to the straight air control pipe 42 to control the operation of the master switch device 4.

The pressure thus provided in straight air pipe 18 for applying the brakes may be of any desired degree less than the maximum obtainable to provide a full straight air application and if less and the engineer desires to increase the degree of brake application, he may move the brake valve handle 40 further away from the release position in order to increase the pressure of fluid in the straight air control pipe 42 and thereby in diaphragm chamber 183 of the master switch device 4. The master switch device will then operate to provide a corresponding increase in pressure in the straight air pipe 18 and as a result a corresponding increase in the degree of straight air brake application. In other words, by varying the position of the brake valve handle 40 from its normal release position, the pressure of fluid in the straight air control pipe 42 and thereby in the straight air pipe 18 may be varied to provide any desired degree of straight air application of the brakes up to the maximum degree.

Fluid under pressure supplied from the straight air pipe 18 for effecting a straight air application of brakes also flows through pipe 147 to the suppression valve device 3 but serves no useful function when the traffic conditions are favorable and the timing magnet 85 is energized. The purpose of this connection between the straight air pipe and the suppression valve device 3 will hereinafter be brought out.

*Electropneumatic release of fluid under pressure from straight air pipe to effect release of a straight air application of brakes*

When the operator desires to effect a release of an electropneumatic straight air application of brakes effected as above described, he returns the brake valve handle 40 to its release position and thereby actuates the straight air self-lapping application and release valve mechanism 38 in the brake valve device 30 to open chamber 43 and thereby the straight air control pipe 42 to the atmosphere. Fluid under pressure may thereby be completely vented from diaphragm chamber 183 in the master switch device through the straight air control pipe 42 and as a result straight air pipe pressure in chamber 184 is rendered effective to return the master switch contact 186 to the brake release position shown. In this position contact 186 is disengaged from the release finger 189 to thereby effect deenergization of the release train wire 20 and of the release magnet 192 connected to said wire. With the release magnet 192 deenergized the straight air pipe 18 is opened to the atmosphere for releasing fluid under pressure therefrom which provides for releasing the straight air application of brakes.

*Automatic control of brakes—Service reduction in brake pipe pressure*

Now let it be assumed that the selector handle 41 on the brake valve device is in the position connecting the rotary valve 34 for movement with the brake valve handle 40 for controlling the brakes through the medium of brake pipe 17 on the usual automatic principle. Under this condition the self-lapping application and release valve device 38 will remain in its release condition so that the straight air control pipe 42 and thereby the straight air pipe 18 will remain at atmospheric pressure.

In order to effect a service application of the brakes on the automatic principle the engineer moves the handle 40 from the release position either directly to service position or first to first service position and then to the service position, these positions being indicated in Fig. 3 of the drawings. The service position may be employed to effect what is known as a straight-away reduction in brake pipe pressure and thus a corresponding service application of brakes. Particularly in the braking of a long freight train such operation however is considered undesirable due to the possibility of rough and possibly disastrous gathering of slack in the train. It is therefore preferred in handling long trains that the engineer first move the brake valve device handle 40 to the first service position for effecting a light or limited service reduction in brake pipe pressure and consequently a light application of the brakes on the train to cause a gentle gathering of the slack in the train following which he may move the brake valve handle to service position for completing the brake pipe reduction, thereby effecting what is commonly known as a split reduction which will now be described.

When the rotary valve 34 is turned to first service position by the brake valve handle 40, passage 61 is lapped by said valve (Fig. 3) for cutting off further flow of fluid at feed valve pressure to the brake pipe by way of the cut-off valve device 29. At the same time, a cavity 234 (Fig. 3) in the rotary valve establishes communication between passages 207 and 222, the passage 207 being open to the equalizing reservoir and equalizing piston chamber 69 by way of passage 71 and cavity 208 in the application slide valve 57 in its release position, while the passage 222 leads to the first reduction reservoir 11. When this communication is established fluid pressure in the equalizing reservoir 10 and equalizing piston chamber 69 is adapted to equalize into the first reduction reservoir 11, which was vented in the release position of the rotary valve, to thereby provide a chosen limited degree of first service reduction in equalizing reservoir pressure on the equalizing piston 68. This reduction in pressure occurs at the usual service rate as controlled by a service choke 235 (Fig. 3) provided in cavity 234 through the rotary valve 34.

When the equalizing reservoir pressure in chamber 69 is thus reduced, the brake pipe pressure in chamber 72 acting on the opposite face of equalizing piston 68 effects movement of said piston in the direction of the left-hand to thereby actuate the bell crank 74 for pulling the brake pipe discharge valve 73 away from its seat. With the discharge valve 73 unseated, fluid under pressure then flows from the brake pipe to passage 75 which is open through a service choke 236 to a passage 237 which is in turn connected to the atmospheric vent 216 by way of a cavity 238 (Fig. 3) in the rotary valve 34. Through this communication fluid under pressure vented from the brake pipe by the brake pipe discharge valve 73 is therefore adapted to flow to the atmosphere at the usual service rate determined by choke 236 for effecting a service rate of reduction in pressure in the brake pipe 17 and in chamber 72 at the right-hand face of equalizing piston 68. The pressure of fluid in the brake pipe will thus continue to reduce to substantially equalization with the reduced and opposing equalizing reservoir pressure in chamber 69 at which time the spring 76 acting on the discharge valve 73 will urge said valve toward its seat to thereby limit the degree of reduction in pressure in the brake pipe 17 to substantially the same degree as effected in the equalizing reservoir 10.

As above mentioned, the first reduction reservoir 11 is so related to the equalizing reservoir 10 that the reduction in brake pipe pressure resulting from equalization of the pressures in said reservoirs will be so limited as to cause only a sufficient application of brakes to gather slack in a train without shock and it will be noted that this reduction occurs at a service rate as controlled by the choke 235 in the equalizing reservoir reduction communication and choke 236 in the brake pipe reduction communication.

Passage 222 connected to the first reduction reservoir 11 is also open to the atmosphere in the release position of the application slide valve 57 by way of passage 222, port 224 containing a choke 239 in said slide valve and thence through the vented cavity 225 in said valve. This vent from the first reduction reservoir 11 is adapted to provide for a continued reduction in equalizing reservoir pressure and thereby in brake pipe pressure after the first service reduction, but at a much slower rate in order that during the gathering of slack in a train incident to the first service reduction in brake pipe pressure the brakes on a train will be very gradually applied. Due to the vent through the choke 239 it will be apparent that the discharge valve 73 may never actually fully close but will be moved toward its seat to a position for throttling the venting of fluid under pressure from the brake pipe to a degree such that the brake pipe pressure will reduce only at a rate equal to the rate of reduction in equalizing reservoir pressure through the choke 239.

In case there is leakage of fluid under pressure from the brake pipe 17 and consequently from chamber 72 at the brake pipe side of the equalizing piston 68 said piston will operate to limit the degree of opening of the discharge valve 73 so that the brake pipe pressure will not reduce at a rate exceeding the rate of reduction in the equalizing reservoir pressure in chamber 69 at the opposite side of the equalizing piston.

However, if the brake pipe leakage is such as to reduce brake pipe pressure at a rate exceeding the service rate of reduction in pressure in the equalizing reservoir 10, then the brake pipe pressure in chamber 72 will become lower than the equalizing reservoir pressure acting on the opposite face of the equalizing piston and as a consequence the equalizing reservoir pressure will move said piston in the direction of the right-hand and actuate the bell crank 74 to unseat the maintaining valve 77. In the first service position of the rotary valve 34 fluid at feed valve pressure is supplied from the rotary valve chamber 33 through a cavity 240 (Fig. 3) to passage 79 and thence to the maintaining valve chamber 78 so that with the maintaining valve 77 unseated fluid under pressure will be supplied to the brake pipe 17 to offset the leakage of fluid under pressure therefrom. The maintaining valve will be opened by the equalizing piston to a degree depending upon the degree of brake pipe leakage and thus only sufficient to supply the required amount of fluid to the brake pipe to prevent the brake pipe pressure from reducing at a rate exceeding the rate of reduction in equalizing reservoir pressure. As a result excessive brake pipe leakage can not increase the rate of brake pipe reduction to a degree exceeding the desired service rate, so that a gentle gathering of slack in a train will be assured.

After the slack in the train has been gathered due to the application of brakes effected by the initial light reduction in brake pipe pressure, the brake valve handle 40 is operated to turn the rotary valve 34 from the first service position to service position (Fig. 3) in which the supply of fluid under pressure to the maintaining valve chamber 78 is cut off and in which the equalizing reservoir 10 and equalizing piston chamber 69 are connected directly to the vent port 216 beneath the rotary valve through a cavity 241 (Fig. 3) to provide for a further reduction in pressure in said reservoir and chamber at a service rate as controlled by a service choke 242 (Fig. 3) provided in the cavity 241. The rotary valve may be allowed to remain in the service position until any desired degree of service reduction up to a full service reduction in pressure in the equalizing reservoir has been effected after which the brake valve handle 40 should be operated to turn the rotary valve 34 to lap position in which the venting communication from the equalizing reservoir is closed so as to thereby prevent further and possibly unnecessary venting of fluid under pressure from said reservoir and equalizing piston chamber 69.

The equalizing discharge valve mechanism 26 responds to this further reduction in equalizing reservoir pressure to effect a corresponding increased reduction in brake pipe pressure to thereby provide a like increase in the degree of brake application on the locomotive and cars of a train in the usual manner.

*Restoration of brake pipe pressure following a service reduction*

In order to restore the pressure in the brake pipe 17 after a service reduction therein for effecting a release brakes, the brake valve handle 40 and rotary valve 34 are returned to their release position shown in the drawing and in this position the brake pipe 17 is recharged with fluid under pressure by way of port 204 in said valve, passage 61, and thence past the cut-off valve 59 which at this time is open. Also in this position of the rotary valve 34 the equalizing reservoir 10 is charged with fluid at the same pressure as supplied to the brake pipe while the first reduction reservoir 11 is vented through port 224 in the slide valve 57, as before described.

*Emergency operation of the brake valve device*

If the engineer desires to effect an emergency application of the brakes on the locomotive and train regardless of the position of the selector handle 41 he moves the brake valve handle 40 to the emergency position indicated in Fig. 3 and thereby turns the rotary valve 34 to a position in which passage 61 is lapped to cut off the supply of fluid under pressure to the brake pipe. In this position of the handle 40 means (not shown) is operated to effect a sudden emergency reduction in brake pipe pressure in the usual well known manner. A showing of the means for effecting an emergency reduction in brake pipe pressure and a further description thereof is not deemed necessary to a clear understanding of the invention and will therefore be omitted.

*Recharging of brake pipe after an emergency reduction*

In order to recharge the brake pipe for effecting a release of brakes after an emergency reduction in brake pipe pressure the handle 40 is operated to turn the rotary valve 34 back to its release position in which the brake pipe 17 is recharged for effecting a release of brakes and in which the other parts of the equipment are conditioned in the same manner as during initial charging of the equipment, as hereinbefore described.

*Automatic reduction of brake pipe pressure upon unfavorable traffic condition or stop signal*

With the brake valve handle 40 and rotary valve 34 in their release position and therefore the brake pipe 17 fully charged with fluid under pressure and the straight air pipe 18 completely vented under which condition the brakes will be released, an automatic application of brakes will be effected in case an unfavorable traffic condition or stop signal is encountered to effect deenergization of the timing magnet 85, unless prevented by alertness of the engineer, as will hereinafter be brought out.

Let it be assumed that the engineer allows the parts of the brake valve device 30 to remain in their release position shown upon deenergization of the timing magnet 85.

Upon deenergization of this magnet the spring 93 seats the valve 87 closing off the supply of fluid under pressure to chamber 90 and thereby to the volume reservoir 106 and chamber 105 and at the same time the valve 86 is unseated to connect said volume and chamber 105 to the vent passage 89 leading to the whistle 91 and restricted atmospheric vent port 243. The fluid pressure in the timing volume 106 and piston chamber 105 is therefore gradually vented through the whistle and the vent port 243, and after a predetermined time interval determined by the volume of said reservoir with respect to the flow capacity of said whistle and vent port, the pressure acting in chamber 105 on the valve piston 103 becomes reduced sufficiently for spring 112 to move said valve piston downwardly from the position shown into engagement with the gasket 110 thereby relieving the pressure of spring 104 on the double beat valve 95 and permitting said valve to be moved to its lower seated position by the pressure of spring 113.

With the double beat valve 95 in its lower position fluid under pressure is vented from the application piston chamber 52 to the atmosphere through passages 53 and 54, pipe 55, past the valve 95 to pipe 97 leading to the suppression valve device and thence past the suppression valve 135 therein, which at this time will be unseated by spring 143 to chamber 129 and from said chamber through passage 130, past the ball check valve 131 and through pipe and passage 132 to the poppet valve chamber 47 in the brake valve device, the poppet valve 49 in this chamber being unseated at this time to thereby allow the venting of fluid under pressure from chamber 47 to the atmosphere through vent 48. Fluid under pressure from the application piston chamber 52 is thus vented to the atmosphere through the brake valve device in release position and when reduced sufficiently below the pressure acting in valve chamber 56 the piston 51 and thereby the slide valve 57 move upwardly against the spring 203 into engagement with a gasket 246 which defines the application position of said piston and slide valve.

In the application position of slide valve 57 a cavity 248 therein connects passage 53 from the application piston chamber 52 to passage 132 leading directly to the poppet valve chamber 47 so as to thereby maintain the application piston and slide valve 57 in their application position as long as the brake valve handle 40 is in its release position, even if the timing valve magnet 85 should again become energized to cause movement of the double beat valve 95 to its upper seated position for closing the venting communication controlled thereby.

Also in the application position of the application slide valve 57, passage 66 connected to the piston chamber 65 in the cut-off valve device 29 is connected by a port 249 in said slide valve to passage 225 which is open through port 250 to the atmospheric vent port 227 so that fluid under pressure is vented from the cut-off valve piston chamber 65 to the atmosphere. When this occurs brake pipe pressure acting on the opposite face of the cut-off valve piston 64 effects movement thereof against the spring 66 to pull the valve 59 into contact with the annular seat rib 60 so as to thereby prevent further flow of fluid under pressure supplied through the rotary valve 34 to passage 61 to the brake pipe 17, the cut-off valve device acting under this condition in the capacity of the rotary valve 34 upon movement out of its release position, as will be apparent.

When the application slide valve 57 is moved to application position, a port 245 therein containing a choke 251 connects passage 71 from the equalizing reservoir 10 and equalizing piston chamber 69 to passages 223 and 228 leading respectively to the first and second reduction reservoirs 11 and 12 whereupon the pressure in the equalizing reservoir 10 is permitted to equalize into both of said reduction reservoirs which are so proportioned as to provide a full service reduction in pressure in said equalizing reservoir. The brake pipe discharge valve mechanism 26 then responds to the reduction in equalizing reservoir pressure to effect a corresponding full service reduction in pressure in the brake pipe 17 for effecting a service application of the brakes in the same manner as hereinbefore described, with the following exception. It will be noted that passage 237 through which fluid under pressure is vented from the brake pipe in first service and service positions of the handle 40 is lapped in the release position of the rotary valve 34. However, this passage is connected by a passage 252 to the seat of the application slide valve 57 which in application position connects said passage to the vent port 227 through a port 253 and thence by way of the vented passage 225, so that in effecting an automatic train control application of brakes fluid vented from the brake pipe by the brake pipe discharge valve 73 escapes to the atmosphere by way of the application slide valve 57.

It will be noted that the brake application valve device 28 has no control over the straight air control pipe 42, so that when said device operates in response to an unfavorable track condition only the brake pipe pressure is varied for causing an application of brakes.

In practice an automatic split reduction device may be employed to control communication between the equalizing reservoir 10 and second reduction reservoir 12 for delaying the reduction in equalizing reservoir pressure into the second reduction reservoir for a chosen interval of time after the equalizing reservoir is connected to the first reduction so as to thereby simulate the split reduction effected manually by the brake valve device as hereinbefore described. Such an automatic split reduction device is disclosed and described in the Hewitt, McNeal patent hereinbefore referred to but the showing of such a device in the present application has been omitted for the sake of simplicity since it in no way is essential to a clear understanding of the invention.

*Recharging of brake pipe subsequent to operation of application valve device to effect a reduction in brake pipe pressure*

In order to effect recharging of the brake pipe 17 following a reduction in pressure effected therein by the automatic operation of the application valve device 28, the magnet 85 of the timing valve device 2 must be energized in response to a clear signal indicating favorable traffic conditions so as to cause movement of the valve 95 to its upper seated position for closing the vent communication between pipe 55 open to the application piston chamber 52 and pipe 97. The brake valve handle 40 must also be operated to turn the rotary valve 34 from release position to lap position to effect closure of the poppet valve 49 in the brake valve device, it being assumed in the above description that said handle was allowed to remain in release position until this time.

With the valve 49 closed and valve 95 in the timing valve device 2 seated in its upper position fluid pressure leaking through port 202 in the application piston 51 from valve chamber 56 into piston chamber 52 equalizes into said piston chamber and through passages 53 and 54 into pipe 55 connected to the timing valve device and also through passage 53, cavity 248 in the application slide valve 57 into passage and pipe 132 leading to above the ball check valve 131 in the suppression valve device. When the pressure in the application piston chamber 52 thus becomes substantially equal to that in valve chamber 56 the spring 203 is rendered effective to shift the application piston 51 and slide valve 57 from their upper application position down to their release position shown.

With the slide valve 57 returned to its release position, passage 53 connected to the application piston chamber 52 is disconnected from passage 132 leading to the poppet valve 49 and lapped by said slide valve, so that the handle 40 may now be operated to turn the rotary valve 34 back to the release position. With the rotary valve 34 returned to release position and with the application slide valve 57 in its release position fluid under pressure is again supplied to the cut-off valve piston chamber 65 and spring 67 then reopens the cut-off valve 59 to effect recharging of the brake pipe 17 with fluid under pressure. The equalizing reservoir 10 and equalizing piston chamber 69 are also recharged with fluid under pressure and the two reduction reservoirs 11 and 12 are opened to the atmosphere, in the same manner as before described.

If the brake valve handle 40 and rotary valve 34 are allowed to remain in release position while the brake application valve device 28 is effecting an automatic train control reduction in brake pipe pressure as above mentioned, it will be noted that since the second reduction reservoir 12 is opened to the atmosphere through passage 217, cavity 215 in the rotary valve 34 and the atmospheric vent port 216, a complete venting of fluid under pressure from the equalizing reservoir 10 and thereby from the brake pipe 17 by operation of the equalizing discharge valve mechanism 26 will occur. This, of course, is undesirable in that all reduction in pressure in the equalizing reservoir and brake pipe in excess of a full service reduction represents an unnecessary loss of fluid pressure which requires time to replace in order to obtain a complete recharging of the brake pipe for effecting a release of brakes following an automatic application. Such complete venting of the equalizing reservoir and brake pipe may however be avoided if at the time the brake application valve device 28 automatically operates to connect the equalizing reservoir 10 to the two reduction reservoirs 11 and 12 the engineer operates the handle 40 to turn the rotary valve 34 to lap position in which the passage 217 from the second reduction reservoir 12 is lapped by the rotary valve so as to close the vent therefrom and thus limit the reduction in equalizing reservoir pressure and thereby in the pressure in the brake pipe 17 to a degree equal substantially to equalization of the pressures in the equalizing reservoir and in the two reduction reservoirs.

If the engineer moves the brake valve rotary valve 34 to lap position at the time an automatic train control application of brakes is effected, as just described, the poppet valve 49 is closed so as to close the vent from the application piston chamber 52. However, under this condition the fluid pressure vented from piston chamber 52 past the double beat valve 95 in the timing valve device to pipe 97 flows past the poppet valve 135 in the suppression valve device, which valve is unseated at this time, to chamber 129 and thence through passage and pipe 130 to the stop reservoir 15. This reservoir will of course eventually become charged with fluid at the pressure in the brake application slide valve chamber 56 due to the supply through port 202 in the application piston 51 to the application piston chamber 52, and at substantially the time such equalization is obtained, spring 203 will return the piston 51 and slide valve 57 to their release positions shown. The volume of the stop reservoir 15 is so related to the flow capacity of port 202 through the application piston 51 however that the piston 51 and slide valve 57 will remain in their upper or application position for a period of time sufficient to provide for equalization of the pressures in the equalizing reservoir 10 and the first and second reduction reservoirs 11 and 12 so as to thereby insure a full service reduction in pressure in the brake pipe 17. When the application piston 51 and slide valve 57 are then returned to their brake release position, the brake pipe pressure will remain reduced however due to the rotary valve 34 in the brake valve device being in lap position cutting off the supply of fluid under pressure to the brake pipe 17.

If the engineer moves the brake valve handle 40 and rotary valve 34 to lap position upon automatic operation of the brake application valve device 28, said device will insure a full service reduction in brake pipe pressure as just mentioned, but an unnecessary and undesired complete loss of fluid under pressure from the equalizing reservoir and from the brake pipe will be prevented. In order to recharge the brake pipe for effecting a release of brakes with the brake valve in lap position as just mentioned the engineer must wait until the timing magnet is again energized to effect seating of the double beat valve 95 so as to close the venting communication between the application piston chamber 52 and poppet valve chamber 47 in the brake valve device. When this occurs he may operate the handle 40 and rotary valve 34 back to release position in which the equalizing reservoir and brake pipe will be recharged with fluid under pressure and the two reduction reservoirs will be vented to the atmosphere in the same manner as above described.

Suppression of brake application valve device 28 by the engineer

When a track esignal becomes unfavorable and causes deenergization of the timing magnet 85 the traffic conditions may not be such as to require a full service reduction in pressure in the brake pipe 17 and thereby a full service application of brakes on the locomotive and cars of a train and a possible stopping of the train. Also any reduction in brake pipe pressure in excess of that actually required represents an undesired and unnecessary loss of fluid pressure and delay in subsequently recharging the brake pipe 17 for releasing the brakes and getting the train under motion.

In other words the unfavorable traffic condition may only be momentary and change back to favorable before either a full service reduction in brake pipe pressure has been completed or the train brought to a stop. Under such a condition it is therefore desirable that an engineer be able to promptly release the brakes on the locomotive and train so that the train may continue its trip.

From the above description of operation of the brake application valve device 28 in response to an unfavorable traffic condition, it will however be noted that once said device moves to its upper or application position a reduction in brake pipe pressure less than a full service reduction can not be prevented even though the traffic condition should become favorable before the reduction was completed. This is necessary to insure the safety of the train but under a condition where such a reduction is not required, it is undesirable as above pointed out.

If the engineer on the locomotive is alert, he may however prevent operation of the brake application valve device 28 in response to an unfavorable traffic signal and thus avoid a condition such as just described, by operating the brake valve device 30, within a certain time interval after whistle 91 associated with the timing valve device 2 starts to sound, to either supply fluid under pressure to the straight air pipe 18 or to effect a service reduction in pressure in the brake pipe 17, as will now be described.

Suppression of brake application valve device 28 by fluid pressure supplied to straight air pipe 18

Let it be assumed that the selector handle 41 of the brake valve device 30 is in the straight air control position and that the engineer is alert and notes operation of the whistle 91 upon deenergization of the timing magnet 85 in response to an unfavorable track signal. The timing volume 106 in the timing valve device 2 and the venting capacity of the whistle 91 and vent choke 243 are so related as to prevent movement of the valve piston 103 and thereby the double beat valve 95 to their lower positions for initiating operation of the brake application valve device 28 until a predetermined time after deenergization of the timing magnet 85 occurs. This period of time is relatively short, but it is of sufficient duration to permit the engineer to operate the brake valve handle 40 to effect operation of the self-lapping straight air application and release valve mechanism 38 to initiate a supply of fluid under pressure to the straight air control pipe 42 for effecting operation of the master switch device 4 to provide a corresponding pressure in the straight air pipe 18 for initiating a straight air application of brakes on a locomotive and cars of a coupled train.

A portion of the fluid pressure thus supplied to the straight air pipe 18 flows therefrom through pipe 147 to the suppression valve device 3 and thence through passage 146 to the lower face of the double check valve 145. Since the upper face of the double check valve 145 is at this time open to the atmosphere through pipe 158 and the exhaust cavity 215 in the rotary valve 34 of the brake valve device, the straight air pressure provided on the lower face of said check valve shifts same to its upper seated position to open communication between the passage 146 and passage 126 through which fluid from the straight air pipe flows to chamber 125 between the diaphragms 119 and 120 in the suppression valve device. When a relatively small degree of pressure, such as 8 pounds, is thus attained in the straight air pipe 18 for initiating a straight air application of brakes, this pressure acting on the differential areas of diaphragms 119 and 120 overcomes the opposing pressure of the relatively light spring 143 acting on diaphragm 118 and deflects said diaphragms in an upwardly direction to a position defined by contact between follower 124 and a stop shoulder 260. This permits spring 138 to seat the suppression valve 135 so as to close the communication through which fluid under pressure has to be vented from the application piston chamber 52 to effect operation of the application valve device 28. Thus if the brake valve device is operated to cause seating of the suppression valve 135 before the double beat valve 95 of the timing valve device is moved to its lower seated position, fluid under pressure will not be vented from the application piston chamber 52, except for an immaterial amount into pipe 97, and as a result the application valve device 28 will remain in its release position shown.

As fluid under pressure is supplied from the straight air pipe 18 to chamber 125 in the suppression valve device for effecting closure of the suppression valve 135, fluid under pressure also flows from the straight air pipe passage 147 through choke 154 into the timing volume 116 and into chamber 142 above the diaphragm 118 and, as will be apparent, this pressure acts in conjunction with spring 143 to urge the several diaphragms in the direction for unseating the suppression valve 135.

However, due to choke 154, the increase in pressure in the volume 116 and diaphragm chamber 142 on the diaphragm 118 is so restricted or retarded, that if the engineer maintains a pressure in the straight air pipe for acting on the diaphragm 119 sufficiently in excess of the opposing fluid pressure acting on diaphragm 118, the several diaphragms will remain in their upper position and the suppression valve 135 will remain seated.

The flow capacity of choke 154 and the volume of chamber 116 are so related that if the engineer increases the pressure in the straight air pipe to a chosen degree, such as 45 pounds which will insure the safety of the train, within a chosen interval of time, a sufficient differential of pressures will be maintained on the diaphragms 118 to 120 to maintain them in their upper positions so that the suppression valve 135 will remain seated. This arrangement is such that the increase in pressure in the straight air pipe may even be effected in steps, if desired.

When the pressure in the straight air pipe 18 and diaphragm chamber 125 becomes increased to the chosen degree, such as 45 pounds above mentioned, this pressure acting on diaphragm 119 overcomes or exceeds the opposing pressure of spring 141 so that said diaphragm will be maintained in its upper position defined by contact with shoulder 260, and thereby the valve 135 will be maintained seated regardless of any further increase in pressure in the timing reservoir 116 and diaphragm chamber 142.

It will be apparent that the pressure attained in volume 116 and chamber 142 will eventually equalize with the pressure in the straight air pipe and when this occurs after the pressure in the straight air pipe has been increased to the above mentioned degree of 45 pounds, the diaphragm 118 will be deflected downwardly until plunger 140 engages a stop 255 but this movement will be relative to diaphragm 119 since the fluid force thereon exceeds the pressure of spring 141. Thus while the pressure in the straight air pipe 18 is maintained at or above the 45 pounds above mentioned, the suppression valve 135 will be maintained seated closing communication between the application piston chamber 52 and the stop reservoir 50 past the double beat valve 95 in the timing valve device 85 whereby the application valve device 28 will be held in its brake release or normal position shown. In other words a permanent suppression of the brake application valve device 28 can be obtained by the chosen degree of increase in pressure in the straight air pipe 18 just described, and it will be noted that the spring 141 determines such increase.

If the engineer fails to increase the pressure in the straight air pipe 18 to the degree which overcomes spring 141 or at such a rate with respect to the rate of increase in fluid pressure on diaphragm 118 through choke 154 as to maintain a sufficient differential of pressures on the diaphragms to hold them in their upper positions against spring 143, then spring 143 will shift the diaphragms to their lower positions shown and in so doing unseat the suppression valve 135. In case this occurs with the valve 95 in the timing valve device 2 still seated in its lower position, the brake application valve device 28 will immediately move to its upper position and cause an automatic full service reduction in brake pipe pressure. Further, in the upper position of the brake application valve device 28 fluid at the pressure supplied by the feed valve device 6 will be supplied from the application valve chamber 56 through port 261 in the slide valve 57 to passage 123 and thence to chamber 122 between the diaphragms 118 and 119 and this pressure acting on the diaphragm 119 will maintain the suppression valve 135 open regardless of any subsequent increase in pressure in the straight air pipe 18 and diaphragm chamber 125 in the suppression device. Thus if the application valve device moves to its upper position it will remain there and cause a full service reduction in pressure in the brake pipe to be effected as above described. To prevent such operation of the brake application valve device, it is therefore imperative that the engineer increase the pressure in the straight air pipe at the chosen rate and to the chosen degree for holding the suppression valve 135 closed, as above described.

It should also be noted that in order to prevent operation of the brake application valve device 28 upon a change in track signals, it is imperative that the engineer obtain a pressure in the straight air pipe 18 and consequently in chamber 125 on the diaphragm 119 sufficient to overcome spring 143 and effect closure of the suppression valve 135 before the double beat valve 95 in the timing valve device moves to its lower position. Otherwise response of the brake application valve device 28 to such movement of the double beat valve will supply fluid under pressure to chamber 122 on the upper face of diaphragm 119 as above described, and thereby prevent the engineer effecting closure of the suppression valve 135.

Assuming that the engineer has operated the brake valve device in such a manner as to prevent response of the brake application valve device 28 to deenergization of magnet 85, he may return the brake valve to its release position for releasing fluid under pressure from the straight air pipe to effect a release of brakes so that the train may proceed, whenever the traffic conditions again become favorable to energize the magnet 85 and thereby effect movement of the double beat valve 95 to its upper seated position. This change in traffic conditions may not occur until after the pressure in the straight air pipe has been increased to the degree required to overcome spring 141. On the other hand it may occur immediately after initiating the supply of fluid under pressure to the straight air pipe and the ability to release the fluid under pressure from the straight air pipe under this condition is desirable in order to facilitate movement of the train.

When fluid pressure is released from the straight air pipe 18 by movement of the brake valve device to release position, as just described, the pressure of fluid in the volume chamber 116 and chamber 142 above the diaphragm 118 will also be released by way of the check valve 156 and passages 146 and 147 along with that from the straight air pipe. The spring 143 acting on the diaphragm 118 is thereby again rendered effective to deflect the diaphragms 118, 119, and 120 to their lower positions for unseating the suppression valve 135 so that the application valve device 28 is again placed under control of the timing valve device 2.

*Suppression of brake application valve 28 with the selector handle 41 of the brake valve device in automatic position*

Under this condition the engineer must also operate the brake valve handle 40 and thereby turn the rotary valve 34 either to the first service position or to the service position for initiating a reduction in brake pipe pressure before unseating of the double beat valve 95 in the timing valve device in order to prevent operation of the brake application valve device 28 in response to an unfavorable track signal.

Let it be assumed that the brake valve rotary valve 34 is turned to the first service position for effecting a first reduction in pressure in the equalizing reservoir 10 and thereby in the brake pipe as hereinbefore described. In this first service position passage 211 connected to the first or temporary suppression reservoir 13, which was charged with fluid under pressure in the release position of rotary valve 34, is connected by a cavity 256 (Fig. 3) in said valve passage 158 leading to the upper face of the double check valve 145. Since the lower face of the double check valve, which is open to the straight air pipe 18, is at this time subject to atmospheric pressure the pressure of fluid from the suppression reservoir 13 acting on its upper face is adapted to effect movement of said valve to its lower seated position so that fluid at this pressure may flow from passage 158 to passage 126 and thence to chamber 125 between the two diaphragms 119 and 120. When the pressure in the diaphragm chamber 125 is thus increased to a degree sufficient to overcome the pressure of spring 143 on the diaphragm 118 the several diaphragms are moved to their upper positions to permit closure of the suppression valve 135 in the same manner as effected by fluid pressure from the straight air pipe 18, as above described. Thus upon subsequent movement of the double beat valve 95 in the timing valve device to its lower seated position the pressure of fluid in the application piston chamber 52 cannot reduce by flow to the stop reservoir as a result of which the application valve device 28 will be maintained in its release position.

In the suppression valve device, passage 158 which is now open to the suppression reservoir 13 is also open through choke 170 to valve chamber 169 which in turn is open to the atmosphere past the unseated valve 167, chamber 174, and vent choke 176 so that the fluid under pressure in the suppression reservoir 13 will be gradually reduced at a rate determined by the choke 170. This choke has such flow capacity with respect to the volume of the suppression reservoir 13 as to maintain a sufficient pressure in the diaphragm chamber 125 to hold the diaphragms in their upper positions and thereby the suppression valve 135 seated only for a period of time sufficient to complete the first service reduction in pressure in the brake pipe 17 as limited by the volume of the first reduction reservoir 11 into which the equalizing reservoir pressure equalizes.

As soon as this initial stage of reduction in pressure in the brake pipe 17 is completed, the engineer must therefore promptly move the brake valve handle 40 and rotary valve 34 to their service positions in which passage 158 is disconnected from the suppression reservoir 13 and connected through a cavity 262 (Fig. 3) to passage 220 which, with the brake application slide valve 57 in release position, is supplied with fluid from the brake pipe by way of passages 62 and 61 and past the open cut-off valve 59. As a result, fluid under pressure from the brake pipe is supplied to the suppression valve device and past the upper seated face of the double check valve 145 therein to chamber 125 between the two diaphragms 119 and 120 and this pressure is adapted to maintain the several diaphragms in their upper suppression position against spring 148 so that the suppression valve 135 will remain seated to prevent operation of the brake application valve device 28.

If the engineer fails to move the brake valve device from service position to the first service position as just described, the pressure in the suppression reservoir 13 acting on the suppression diaphragm 119 will become so reduced through choke 170 that spring 143 will deflect the several diaphragms downwardly and unseat the suppression valve 135. The application valve device 28 will then operate to complete the full service reduction in brake pipe pressure. Movement of the brake valve to service position before the pressure in the suppression reservoir 13 becomes so reduced will however maintain the suppression valve 135 seated and prevent such undesired operation of the brake application valve device 28. Moreover in service position of the brake valve device, the second reduction reservoir becomes effective to continue the reduction in pressure in the equalizing reservoir and thereby in the brake pipe as desired.

Also in service position of the brake valve rotary valve 34 a cavity 263 therein (Fig. 3) connects passage 75 to which fluid under pressure is vented from the brake pipe past the discharge valve 73 to a passage 264 leading to the suppression valve device and through this communication fluid being discharged from the brake pipe past the discharge valve 73, on account of the brake valve being in service position is caused to flow to the timing reservoir 16 by way of a check valve 265 in the suppression valve device, a chamber 266, and thence through a choke 267 to passage 175 leading to said reservoir. Thus while effecting the second stage of reduction in equalizing reservoir pressure into the second reduction reservoir 12 in the service position of the brake valve device, the suppression valve 135 will be maintained in its closed position by fluid under pressure from the brake pipe and at the same time the timing reservoir 16 will become charged with fluid vented from the brake pipe past the discharge valve 73. It will be noted that during this suppression there will be a restricted venting of fluid from the brake pipe through choke 170 in the suppression valve device to chamber 169 and thence past the valve 167 to chamber 174 which is open to the timing reservoir 16 and also to the atmosphere through vent port 176, but the flow capacity of this vent port is so restricted as to provide for a desired increase in pressure in the timing reservoir 16 from the brake pipe discharge as above mentioned.

Since in normal or release position of the brake application valve device 28 the second reduction reservoir 12 is open to the atmosphere, it is necessary, if the engineer desires to limit the reduction in equalizing reservoir pressure to a full service degree, to move the brake valve handle 40 and rotary valve 34 from their service position to lap position at the time such reduction is completed. In lap position of rotary valve 34 passages 158 and 220 are disconnected thus terminating the supply of fluid under pressure from the brake pipe to the suppression valve device but at this time the pressure of fluid obtained in the timing reservoir 16 in the service position of the rotary valve becomes effective past the unseated valve 167 and through choke 170 to maintain a pressure in passage 158 and past the upper end of the double check valve 145 in diaphragm chamber 125 of such a degree as to hold the parts of the suppression valve device in their upper position providing for the suppression valve 135 to remain seated. The timing reservoir 16 is supplied with fluid under pressure vented past the discharge valve 73 in the lap position of rotary valve 34 the same as in service position so that as long as the discharge valve 73 remains open and thereby maintains a sufficient pressure on the suppression diaphragm 119 the suppression valve 135 will remain seated to prevent operation of the brake application valve device 28.

In the reduction insuring valve device 160 it will be noted, as previously described, that chamber 162 below the diaphragm 161 is open to the suppression reservoir 14 which in the release position of the brake valve device was charged through passage and pipe 164 with fluid at the pressure supplied to the brake pipe. In first service, lap, and service positions of the rotary valve 34 the passage 164 is lapped, thereby bottling the pressure in the suppression reservoir 14 and diaphragm chamber 162 at the same degree as initially provided in the brake pipe. Chamber 165 at the opposite side of diaphragm 162 is in constant communication with the brake pipe 17 through passage 166 and as a result the pressure on the opposite side of said diaphragm reduces with brake pipe pressure.

The spring 178 in the reduction insuring valve device is of such value that when a full service reduction in pressure in the brake pipe and thereby in chamber 165 above the diaphragm 161 is obtained the pressure of fluid in chamber 162 becomes effective to shift the valves 167 and 168 from the position shown to the position in which the valve 167 is seated and the valve 168 is unseated. Diaphragm chamber 125 in the suppression valve device is thereby connected directly to the brake pipe by way of chamber 165 and past the valve 168. Thus after a full service reduction in brake pipe pressure has been attained, fluid at brake pipe pressure becomes effective on diaphragm 119 to maintain the parts of suppression valve device in their upper positions and thereby the suppression valve 135 seated so as to prevent operation of the brake application valve device.

If the engineer moves the brake valve handle 40 and rotary valve 34 from service position to lap position before completing a full service reduction in pressure in the equalizing reservoir 10 however, then the equalizing discharge valve mechanism 26 will act to limit the reduction in pressure in the brake pipe 17 and diaphragm chamber 165 of the reduction insuring valve device to a correspondingly less than full service degree. As a result the brake pipe pressure in chamber 165 of the reduction insuring valve device will maintain the valves 167 and 168 in the position shown. Under this condition after the supply of fluid under pressure to the timing reservoir 16 is terminated by closure of the brake pipe discharge valve 73 such pressure will be gradually dissipated through the vent port 176 and as a result the pressure in diaphragm chamber 125 of the suppression valve device will reduce and when this reduction becomes sufficient spring 143 will deflect the several diaphragms to their lower positions for unseating the suppression valve 135 to thereby connect the application piston chamber 52 to the stop reservoir 15 whereupon the application valve device 28 will operate in the manner before described to insure a full service reduction in pressure in the equalizing reservoir 10 and thereby in the brake pipe 17. In order to prevent such operation of the brake application valve device 28 it is therefore imperative that the engineer effect a full service reduction in pressure in the equalizing reservoir 10 bfore moving the rotary valve 34 to lap position.

If during the time the engineer is effecting a reduction in brake pipe pressure as required to prevent response of the brake application valve device to the unfavorable track signal, said signal should change to favorable and cause the magnet 85 to be energized and as a result the double beat valve 95 to be moved to its upper position for closing the vent communication from the application piston chamber 52, he may promptly return the brake valve handle 40 and rotary valve 34 to release position in which the brake pipe and equalizing reservoir will be recharged and other parts of the equipment will obtain their normal conditions as before described, so that the train may proceed.

If, however, the unfavorable track condition remains until after a full service reduction in brake pipe pressure has been completed by operation of the brake valve device, the brake valve device must be allowed to remain in lap position until after the track condition again becomes favorable in order that the brake application valve device will remain in its normal position when the brake valve is returned to release position. If the engineer should move the brake valve to release position before the track signal becomes favorable, the consequent increase in brake pipe pressure in chamber 165 of the reduction insuring valve device 117 will cause deflection of diaphragm 161 to its lower position and as a result valve 168 would be seated and valve 167 unseated and vent the suppression diaphragm chamber 125. Spring 143 would then unseat the suppression valve 135 and the brake application valve device 28 would move to its application position. This can be prevented however by the engineer allowing the brake valve to remain in lap position until the track signal becomes favorable. He may then move the brake valve to release position and the equipment will be reconditioned, as above described, to permit the train to proceed.

It should be also noted that upon a change in track signal to unfavorable, it is imperative, if the engineer desires to prevent operation of the brake application valve device 28, that he operate the brake valve device to effect closure of the suppression valve 135 before movement of the double beat valve 95 in the timing valve device 2 to its lower position. Otherwise, the application valve device 28 will move to its application position and supply fluid under pressure to chamber 127 between the diaphragms 118 and 119 in the suppression valve device and this pressure acting on the diaphragm 119 will maintain the suppression valve 135 open and thereby ensure an automatic application of brakes.

In the operation of the suppression valve device 3 when the selector handle 41 is in the position providing for control of brake pipe pressure it will be noted that spring 141, which controls permanent straight air suppression, merely acts as a substantially rigid strut for connecting the diaphragm 119 to the spring 143. It will also be noted that spring 143 determines in both straight air and automatic conditions of the brake valve device, as determined by the selector handle 41, the degree of pressure which must be provided on the diaphragm 119 in chamber 125, to initially prevent operation of the brake application valve device in response to an unfavorable traffic condition.

*Summary*

It will now be seen that the improved suppression valve device 3 is operative to prevent response of the automatic brake application valve device 28 to an unfavorable track signal if the engineer is alert and operates the brake valve device 30 within a chosen interval of time after the change in signal indication to either supply fluid under pressure to the straight air pipe or effect a reduction in pressure in the brake pipe.

The one suppression valve device functions for both of those different types of brake control, the double check valve 145 being provided to connect the suppression device to the type of control being employed and to disconnect it from the other control.

The choke 154 and timing volume 16 in the suppression valve device provides for suppression of the brake application valve device 28 upon a series of successive steps of increase in pressure in the straight air pipe 18 or upon one continuous increase in pressure therein so long as such increase is effective within a chosen interval of time which will insure the safety of the train with which the equipment is associated. Failure to provide such an increase in pressure in the straight air pipe will render the pressure in diaphragm chamber 142 and the connected volume 116 effective to unseat the suppression valve 135 so as to thereby cause the brake application valve device 28 to operate and provide a full service application of brakes through the medium of effecting a reduction in pressure in the brake pipe 17. If however the pressure in the straight air pipe is increased to a degree to insure safety of the train within the interval of time above mentioned the suppression valve 135 will remain seated regardless of the pressure subsequently obtained in diaphragm chamber 142 and volume 116. On the other hand if the brake valve device is conditioned to vary the pressure in the brake pipe 17 for controlling the brakes on the locomotive and a connected train the first suppression reservoir 13 provides for maintaining the suppression valve 135 seated for a period of time adequate to effect a slack gathering reduction in pressure of the brake pipe 17 and if the brake valve device is then moved as intended to service position for effecting a full service reduction in brake pipe pressure, the suppression valve 135 will be maintained seated even upon subsequent movement of the brake valve back to lap position. If less than the required full service reduction of brake pipe pressure is effected however the suppression valve 135 will remain closed only until enclosure of the brake pipe discharge valve 73 after which the brake application valve device 28 will operate to increase the reduction in brake pipe pressure to the full service degree.

Thus if the engineer is alert and operates the brake valve as intended, regardless of the position of the selector handle 41 on the brake valve device, the suppression valve device will prevent operation of the brake application valve device 28 upon response of the timing valve device 2 to a change in track signals. Failure of such operation will however result in automatic operation of the brake application valve device 28, as above pointed out.

Having now described my invention, what I claim as new and desire to secure by Letters Patent, is:

1. In a brake mechanism, in combination, automatic means adapted to operate upon a change in track signals to effect an application of brakes, an engineer's brake valve device operative manually to effect an application of brakes, suppression means normally rendering said automatic means responsive to a change in track signals and operative to render said automatic means non-responsive to a change in track signals, control means for said suppression means operative, upon operation of said brake valve device to effect an application of brakes, to provide a suppression force proportional to the degree of brake application and to provide another force opposing said suppression force, means for retarding the increase in the opposing force with respect to a chosen rate of increase in the degree of brake application, said suppression means being operative by said suppression force upon said chosen rate of increase in brake application to render said automatic means non-responsive to a change in track signal, said opposing force being operative upon an increase in brake application effected by said brake valve device at a rate less than said chosen rate to render said automatic means responsive to said change in track signals, and means controlled by the degree of brake application effected by said brake valve device and operative upon an increase therein to a chosen degree at said chosen rate to render said opposing force ineffective.

2. In a brake mechanism, in combination, automatic means adapted to operate upon a change in track signals to effect an application of brakes, an engineer's brake valve device operative manually to effect an application of brakes, suppression means normally rendering said automatic means responsive to a change in track signals and operative to render said automatic means non-responsive to a change in track signals, said suppression means being controlled by the opposing fluid pressures in a suppression chamber and in a constantly connected control chamber, means operative upon operation of said brake valve device to effect an application of brakes to supply fluid to said suppression chamber at a pressure proportional to the degree of brake application and to also supply fluid under pressure to said control chamber, means for retarding the supply of fluid under pressure to said control chamber, said suppression means being operative by the pressure in said suppression chamber upon a chosen rate of increase in brake application effected by said brake valve device to render said automatic means non-responsive to a change in track signal, said suppression means being operative by the pressure in said control chamber upon a slower rate of increase in brake application effected by said brake valve device to render said automatic means responsive to said change in track signal, and means conditioned upon an increase in pressure in said suppression chamber to a chosen degree at said chosen rate to render the pressure in said suppression chamber effective to maintain said automatic means non-responsive to said change in track signals regardless of the pressure in said control chamber.

3. In a brake mechanism, in combination, automatic means adapted to operate upon a change in track signals to effect an application of brakes, an engineer's brake valve device operative manually to effect an application of brakes, suppression means normally rendering said automatic means responsive to a change in track signals and operative to render said automatic means non-responsive to a change in track signals, control means for said suppression means operative, upon operation of said brake valve device to effect an application of brakes, to provide a suppression force proportional to the degree of brake application and to provide another force opposing said suppression force, means for retarding the increase in the opposing force with respect to a chosen rate of increase in the degree of brake application, said suppression means being operative by said suppression force upon said chosen rate of increase in brake application to render said automatic means non-responsive to a change in track signal, said opposing force being operative upon an increase in brake application effected by said brake valve device at a rate less than said chosen rate to render said automatic means responsive to said change in track signals, means controlled by the degree of brake application effected by said brake valve device and operative upon an increase therein to a chosen degree at said chosen rate to render said opposing force ineffective, and means operative upon operation of said automatic means in response to said change in track signals to provide a force on said suppression means for rendering said suppression means non-operative by said suppression force.

4. In a brake mechanism, in combination, automatic means adapted to operate upon a change in track signals to effect an application of brakes, an engineer's brake valve device operative manually to effect an application of brakes, a suppression member having a normal position providing for response of said automatic means to said change in track signals and a suppression position for rendering said automatic means non-responsive to said change in track signals, a biasing spring acting on said suppression member for urging same to said normal position, means operative upon operation of said brake valve device to effect an application of brakes, to provide a suppression force and an opposing force acting on said suppression member, said suppression force increasing in proportion to the degree of brake application, means for retarding the increase in said opposing force for rendering said suppression force effective to hold said suppression member in said suppression position upon a chosen rate of increase in the degree of brake application effected by said brake valve device and providing for movement of said suppression member to said normal position by said biasing spring upon a slower rate of increase in the degree of brake application, and means arranged to render said biasing spring effective when the brake application effected by said brake valve device at said chosen rate is of less than a chosen degree and ineffective upon an increase in brake application to above said chosen degree.

5. In a brake mechanism, in combination, automatic means adapted to operate upon a change in track signals to effect an application of brakes, an engineer's brake valve device operative manually to effect an application of brakes, a suppression member having a normal position providing for response of said automatic means to said change in track signals and a suppression position for rendering said automatic means non-responsive to said change in track signal, two connected force producing elements connected to said suppression member for controlling the position thereof, one of said elements constituting a suppression element and the other an opposing element, means operative upon operation of said brake valve device to provide said suppression element with a force proportional to the degree of brake application effected by said brake valve device and also operative at the same time to provide said opposing element with force, means for retarding the increase in force of said opposing element with respect to a chosen rate of increase in the degree of brake application effected by said brake valve device to render said suppression element effective to hold such suppression member in said suppression position, means operative to move such suppression element to said normal position upon a slower rate of increase in brake application effected by said brake valve device, the connection between said two force producing elements comprising a spring operative to render said opposing force producing element ineffective upon an increase in the force of said suppression element to a degree equal to or exceeding that of said spring.

6. In a brake mechanism, in combination, automatic means adapted to operate upon a change in track signals to effect an application of brakes, a suppression pipe, an engineer's brake valve device operative to effect an application of brakes and to at the same time provide a pressure in said pipe proportional to the degree of brake application, a suppression element for controlling operation of said automatic means and having a normal position for rendering said automatic means responsive to said change in track signals and a suppression position for rendering said automatic means non-responsive to said change in track signal, a timing volume, a restricted communication connecting said volume to said pipe providing for charging of said volume with fluid under pressure from said pipe, a control spring, a biasing spring, a pair of spaced movable abutments connected by said control spring and operatively connected to said suppression element, one of said abutments being subject on one face to the pressure of fluid in said volume and the pressure of said biasing spring and the other being subject on its opposite face to the pressure of fluid in said pipe, the last named abutment being operative to effect movement of said suppression element to and to maintain same in said suppression position upon an increase in pressure in said pipe at a rate which provides a differential between the opposing fluid pressures on said abutments which exceeds the force of said biasing spring, said biasing spring being operative on a smaller differential of forces on said abutments to move said suppression element into said normal position, said control spring providing for movement of said abutments in unison until the pressure in said pipe is increased to a degree exceeding the pressure of said control spring and said control spring being then operative to provide for movement of the abutment subject to pressure in said volume relative to the other abutment to provide for the last named abutment to maintain said suppression element in said suppression position upon further increase in pressure in said volume.

7. In a brake mechanism, in combination, automatic means adapted to operate upon a change in track signals to effect an application of brakes, a straight air pipe, an engineer's brake valve device operative to effect a supply of fluid under pressure to said pipe, a suppression element controlling operation of said automatic means and having a normal position for rendering said automatic means responsive to said change in track signals and a suppression position for rendering said automatic means non-responsive to said change in track signals, a movable abutment having at one side a suppression chamber connected to said pipe, a timing volume, a restricted communication connecting said volume and pipe providing for a retarded increase in pressure in said volume upon a chosen rate of increase in pressure in said pipe, a second movable abutment subject to the pressure of fluid in said volume, a bias spring acting on said second abutment, the force on said second abutment opposing the force on the first named abutment, a control spring interposed between and connecting said abutments, an increase in pressure in said pipe on the first named abutment at a rate so exceeding the rate of increase in pressure in said volume as to provide a differential of fluid forces on said abutments exceeding the pressure of said bias spring being operative to render the first named abutment effective to maintain said suppression element in suppression position, said bias spring being operative to actuate said abutments to move said suppression element to said normal position upon an increase in pressure in said pipe at a rate which provides a differential of pressures on said abutments of a degree less than the force of said bias spring, said control spring providing for movement of the second named abutment by said bias spring relative to the first named abutment upon an increase in pressure in said pipe and on said first named abutment which provides a force equal to or exceeding the opposing force of said control spring for thereby rendering said bias spring ineffective to move said suppression member to normal position.

8. In a brake mechanism, in combination, automatic means adapted to operate upon a change in track signals to effect an application of brakes, a straight air pipe, an engineer's brake valve device operative to effect a supply of fluid under pressure to said pipe, a suppression element controlling operation of said automatic means and having a normal position for rendering said automatic means responsive to said change in track signals and a suppression position for rendering said automatic means non-responsive to said change in track signals, a movable abutment having at one side a suppression chamber connected to said pipe, a timing volume, a restricted communication connecting said volume and pipe providing for a retarded increase in pressure in said volume upon a chosen rate of increase in pressure in said pipe, a second movable abutment subject to the pressure of fluid in said volume, a bias spring acting on said second abutment, the force on said second abutment opposing the force on the first named abutment, a control spring interposed between and connecting said abutments, an increase in pressure in said pipe on the first named abutment at a rate so exceeding the rate of increase in pressure in said volume as to provide a differential of fluid forces on said abutments exceeding the pressure of said bias spring being operative to render the first named abutment effective to maintain said suppression element in suppression position, said bias spring being opertaive to actuate said abutments to move said suppression element to said normal position upon an increase in pressure in said pipe at a rate whoch provides a differential of pressures on said abutments of a degree less than the force of said bias spring, said control spring providing for movement of the second named abutment by said bias spring relative to the first named abutment upon an increase in pressure in said pipe and on said first named abutment which provides a force equal to or exceeding the opposing force of said control spring for thereby rendering said bias spring ineffective to move said suppression member to normal position, said automatic means being operative upon response to a change in track signals to supply fluid to the opposite face of the first named abutment at a pressure to hold same against movement by fluid under pressure supplied to said pipe to thereby maintain said supppression member in its normal position.

9. In a brake mechanism, in combination, a brake application valve operative from a normal position upon venting of fluid under pressure from a chamber to effect an application of brakes, a track signal controlled device conditional with the track signal favorable to close a vent communication from said chamber and operative to open said vent communication upon a change in track signal to effect venting of fluid under presurse from said chamber, a suppression valve also controlling said communication and normally opening same to provide for venting of fluid under pressure from said chamber by way of said track signal control device and being also operative to close said communication, a straight air brake control pipe, an engineer's brake valve device operative to effect a supply of fluid under pressure to said pipe for effecting an application of brakes to a degree dependent upon the pressure of fluid supplied to said pipe, a flexible diaphragm connected to said suppression valve and having one side open to said straight air pipe, a control spring, another flexible diaphragm connected by said control spring to the first named diaphragm, the opposite side of said second named diaphragm being open to said straight air pipe through a choked communication for retarding the increase in pressure thereon upon an increase in pressure in said pipe and on the first named diaphragm by operation of said brake valve device, a bias spring acting on the said opposite side of said second named diaphragm, the first named diaphragm being operative upon an increase in pressure in said straight air pipe at a rate which provides a differential between the opposing fluid forces on the two diaphragms in excess of the pressure of said bias spring to move said suppression valve to its communication closing position, said bias spring being effective upon a less differential between the opposing fluid pressures on said diaphragms to move said suppression valve to its communication opening position, an increase in pressure in said pipe to a degree which provides a force on the first named diaphragm exceeding the force of said control spring rendering said bias spring ineffective to move said suppression valve to its communication opening position.

10. In a brake mechanism, in combination, a brake application valve operative from a normal position upon venting of fluid under pressure from a chamber to effect an application of brakes, a track signal controlled device conditional with the track signal favorable to close a vent communication from said chamber and operative to open said vent communication upon a change in track signal to effect venting of fluid under pressure from said chamber, a suppression valve also controlling said communication and normally opening same to provide for venting of fluid under pressure from said chamber by way of said track signal control device and being also operative to close said communication, a straight air brake control pipe, an engineer's brake valve device operative to effect a supply of fluid under pressure to said pipe for effecting an application of brakes to a degree dependent upon the pressure of fluid supplied to said pipe, a flexible diaphragm connected to said suppression valve and having one side open to said straight air pipe, a control spring, another flexible diaphragm connected by said control spring to the first named diaphragm, the opposite side of said second named diaphragm being open to said straight air pipe through a choked communication for retarding the increase in pressure thereon upon an increase in pressure in said pipe and on the first named diaphragm by operation of said brake valve device, a bias spring acting on the said opposite side of said second named diaphragm, the first named diaphragm being operative upon an increase in pressure in said straight air pipe at a rate which provides a differential between the opposing fluid forces on the two diaphragms in excess of the pressure of said bias spring to move said suppression valve in its communication closing position, said bias spring being effective upon a less differential between the opposing fluid pressures on said diaphragms to move said suppression valve to its communication opening position, an increase in pressure in said pipe to a degree which provides a force on the first named diaphragm exceeding the force of said control spring rendering said bias spring ineffective to move said suppression valve to its communication opening position, said control spring being contained in a chamber between said two diaphragms, and said brake application valve being operative in effecting an application of brakes to supply fluid under pressure to the last named chamber for rendering the first named flexible diaphragm immovable by fluid pressure supplied to said straight air pipe, said brake application valve in its normal position venting the last named chamber.

11. In a brake mechanism, in combination, automatic means adapted to operate upon a change in track signals to effect an application of brakes, a suppression member normally conditioned to provide for operation of such automatic means in response to a change in track signals and operative to render said automatic means non-responsive to a change in track signals, a straight air pipe to which fluid under pressure is adapted to be supplied to effect an application of brakes, a brake pipe a reduction in pressure in which is adapted to effect an application of brakes, an automatic suppression pipe, an engineer's brake valve device selectively operative to either effect a supply of fluid under pressure to said straight air pipe or to effect a reduction in pressure in said brake pipe and supply fluid under pressure to said suppression pipe, suppression means controlling said suppression member adapted to be operated by fluid under pressure in a chamber to effect operation of said suppression member to render said automatic means non-responsive to a change in track signals, and means constantly subject to the pressure of fluid in said straight air pipe and suppression pipe and operative upon supply of fluid under pressure to either one of such pipes to open communication therebetween and said chamber and close communication between said chamber and the other pipe.

12. In a brake mechanism, in combination, automatic means adapted to operate upon a change in track signals to effect an application of brakes, a suppression member normally conditioned to provide for operation of such automatic means in response to a change in track signals and operative to render said automatic means non-responsive to a change in track signals, a straight air pipe to which fluid under pressure is adapted to be supplied to effect an application of brakes, a brake pipe, a reduction in pressure in which is adapted to effect an application of brakes, an automatic suppression pipe, an engineer's brake valve device selectively operative to either effect a supply of fluid under pressure to said straight air pipe or to effect a reduction in pressure in said brake pipe and supply fluid under pressure to said suppression pipe, suppression means controlling said suppression member adapted to be operated by fluid under pressure in a chamber to effect operation of said suppression member to render said automatic means non-responsive to a change in track signals, means constantly subject to the pressure of fluid in said straight air pipe, and suppression pipe and operative upon supply of fluid under pressure to either one of such pipes to open communication therebetween and said chamber and close communication between said chamber and the other pipe, and means operative upon operation of said automatic means to render said suppression means non-operable by fluid under pressure supplied to said chamber.

13. In a brake mechanism, in combination, automatic means adapted to operate upon a change in track signals to effect an application of brakes, a suppression member normally conditioned to provide for operation of said automatic means upon a change in track signals and operative to render said automatic means non-responsive to a change in track signals, a movable abutment connected to said suppression member and having at one side a chamber and adapted to be operated upon supply of fluid under pressure to said chamber to actuate said suppression member to render said automatic means non-responsive to a change in track signal, a straight air pipe to which fluid under pressure is adapted to be supplied for effecting an application of brakes, a suppression pipe to which fluid under pressure is also adapted to be supplied, and a double check valve device arranged to control communication between said pipes and said chamber whereby upon supply of fluid under pressure to either one or the other of said pipes and then to said chamber said abutment will be operated to effect operation of said suppression member to render said automatic means non-responsive to a change in track signal, a brake pipe, a reduction in pressure in which is adapted to effect an application of brakes, and an engineer's brake valve device selectively operative to either supply fluid under pressure to said straight air pipe or to effect a reduction in pressure in said brake pipe, said brake valve device in effecting a supply of fluid under pressure to said straight air pipe venting said suppression pipe and in effecting a reduction in pressure in said brake pipe supplying fluid under pressure to said suppression pipe and venting said straight air pipe.

14. In a brake mechanism, in combination, automatic means adapted to operate upon a change in track signals to effect an application of brakes, a suppression member normally conditioned to provide for operation of said automatic means upon a change in track signals and movable to a suppression position to render said automatic means non-responsive to a change in track signals, a straight air pipe to which fluid under pressure is adapted to be supplied for effecting an application of brakes, and means controlled by the fluid pressure supplied to said straight air pipe for controlling said suppression member, said means comprising two movable abutments, a control spring under pressure interposed between and bearing on said abutments, means connecting said abutments together for limiting movement away from each other under action of said control spring and providing for movement of said abutments in the direction of each other, one of said abutments being connected to said suppression member and having at its outer face a suppression chamber open to said straight air pipe to provide for an increase in pressure therein in accordance with the increase in pressure in said pipe, the other abutment having at its outer face a control chamber open to said straight air pipe through a restricted communication adapted to delay an increase in pressure in said control chamber upon supply of fluid under pressure to said straight air pipe at a chosen rate, a bias spring in said control chamber acting on said other abument for actuating both abutments to move said suppression member to its suppressing position when the pressure of fluid in said control chamber plus that of said bias spring exceeds the opposing fluid pressure in said suppression chamber, an increase in pressure in said straight air pipe and suppression chamber which provides a differential of pressures on the two abutments in excess of the force of said bias spring being adapted to urge said abutments to the position to effect movement of said suppression member to its suppressing position, the first named abutment being operative upon an increase in pressure in said straight air pipe to a degree exceeding the opposing force of said control spring, to maintain said supression member in said suppression position regardless of further increase of fluid pressure in said control chamber.

15. In a brake mechanism, in combination, automatic means adapted to operate upon a change in track signals to effect an application of brakes, a suppression member having a normal position providing for response of said automatic means to a change in track signals and a suppression position for rendering said automatic means non-responsive to a change in track signals, a movable suppression abutment having at one side a suppression chamber to which fluid under pressure is adapted to be supplied for moving said suppression member to said suppression position, a bias spring acting on said abutment for actuating same to move said suppression member to said normal position, a straight air pipe to which fluid under pressure is adapted to be supplied to effect an application of brakes, a brake pipe, a reduction in pressure in which is adapted to effect an application of brakes, and engineer's brake valve device selectively operative to either supply fluid under pressure to said straight air pipe or to effect a reduction in pressure in said brake pipe, an automatic suppression pipe supplied with fluid under pressure by said brake valve device in the position for effecting a reduction in pressure in said brake pipe, a double check valve controlling communication between said straight air pipe and automatic suppression pipe and said suppression chamber and operative upon supply of fluid under pressure to either said straight air pipe or said automatic suppression pipe to connect the pipe supplied with fluid under pressure to said suppression chamber, a movable control abutment, a control spring interposed between and engaging said abutments, said control abutment having at its outer face a control chamber open at all times to said straight air pipe through a restricted communication providing for a retarded increase in pressure in said control chamber upon an increase in pressure in said straight air pipe and in said suppression chamber at a chosen rate for rendering said suppression abutment effective to maintain said suppression member in its suppression position against the opposing force of said bias spring and the retarded increase in pressure in said control chamber, said bias spring and the pressure in fluid in said control chamber being effective upon a slower rate of increase in pressure in said straight air pipe to move said abutments against the pressure in said suppression chamber to thereby move said suppression member to its normal position, said suppression abutment upon an increase in pressure in the straight air pipe and suppression chamber to a degree exceeding the pressure of said control spring being operative to maintain said suppression member in its suppression position upon equalization of the pressures on said abutments, said brake valve device in effecting a reduction in brake pipe pressure also venting fluid under pressure from said straight air pipe whereby the pressure of fluid supplied to said suppression chamber is opposed only by the pressure of said bias spring, said automatic suppression pipe having a restricted vent to the atmosphere providing for gradual release of fluid under pressure from said suppression chamber, a valve normally opening said vent to the atmosphere, and a movable abutment subject to the pressure of fluid in the brake pipe and an opposing pressure equal to that normally carried in the brake pipe and operative upon a full service reduction in pressure in said brake pipe to actuate said valve to close said vent and to supply fluid under pressure from said brake pipe to said suppression chamber to maintain the fist named abutment in the position in which said suppression member is held in its suppression position.

GLENN T. McCLURE.